Dec. 6, 1949　　　　E. V. CULLEN　　　2,490,582
DRAG LINE BUCKET
Filed April 28, 1945　　　　　　　　5 Sheets-Sheet 1

Dec. 6, 1949     E. V. CULLEN     2,490,582
DRAG LINE BUCKET

Filed April 28, 1945     5 Sheets-Sheet 3

Inventor
Edward V. Cullen
By Fred Gerlach
atty.

Dec. 6, 1949 E. V. CULLEN 2,490,582
DRAG LINE BUCKET
Filed April 28, 1945 5 Sheets-Sheet 5

Inventor:
Edward V. Cullen
By Fred Gerlach Atty.

Patented Dec. 6, 1949

2,490,582

UNITED STATES PATENT OFFICE 2,490,582

DRAGLINE BUCKET

Edward V. Cullen, Chicago, Ill., assignor to Cullen-Friestedt Company, Chicago, Ill., a corporation of Illinois Application April 28, 1945, Serial No. 590,778

12 Claims. (Cl. 37—135)

The present invention relates generally to drag line buckets for excavation and like work. More particularly the invention relates to that type of drag line bucket which is open at the front and top, has a rigid arch connected to the front upper corners of its sides and disposed ahead or in front of the front end of its bottom, and is adapted for use in connection with a derrick having a boom projecting from the rotatable deck thereof, a hoist line leading from a power driven winch on the deck and passing over a sheave at the outer or distal end of the boom and a drag or load line leading from a power driven winch on the deck and passing over a sheave adjacent the inner or proximal end of the boom.

In connection with use of a conventional or standard drag line bucket the free or outer end of the derrick hoist line is connected by a pair of chains to a pair of outwardly extending lugs on the rear ends of the bucket sides and the free end of the drag line is connected by a pair of chains to the front ends of the bucket sides. When it is desired to use a conventional drag line bucket for excavation or other work it is necessary to perform the following cycle of steps each time the bucket is used. While the drag line is slack the bucket is first lowered in a depending position by the hoist line until the arch and the front end of the bottom of the bucket rest on the material to be excavated. After lowering of the bucket and while the hoist line is slack the bucket is dragged towards the derrick by taking up the drag line by way of its power driven winch. After the bucket is drawn or dragged towards the derrick to the desired extent the bucket is hoisted by taking up on the hoist line while the drag line is under tension. Thereafter the bucket is shifted or moved to the outer end of the boom by taking up on the hoist line while paying out the drag line. After shift or movement of the bucket to the outer end of the boom the deck of the derrick is rotated to one side until the outer end of the boom is over the location where the material in the bucket is to be discharged. Thereafter the drag line is payed out so as to cause the bucket to swing downwards into a material discharging position. Because of the numerous steps that are included in each cycle use of a conventional or standard drag line bucket requires a considerable length of time and entails the services of a highly skilled operator. With a conventional or standard drag line bucket it is impossible to discharge the excavated material at the point where dragging of the bucket toward the derrick ceases and it is necessary in order to maintain the bucket level or horizontal while it is being shifted toward the outer end of the boom preparatory to a discharging operation to employ a so-called leveling line which is reeved over a sheave adjacent the upper ends of the chains between the free end of the hoist line and the lugs on the rear ends of the bucket sides and has one end thereof attached or anchored to the central portion of the bucket arch and its other end connected to the remote ends of the drag chains, i. e., the chains between the free end of the drag line and the front ends of the bucket sides.

One object of the invention is to provide a drag line bucket which is an improvement upon, and may be operated more expeditiously than, conventional or standard buckets and is characterized by the fact that it is so designed and constructed that it does not require or entail the use of a leveling line, and may be manipulated into its material discharging position at the point where dragging thereof is stopped. By arranging and constructing the bucket so that it may be manipulated into its material discharging position at the point where dragging thereof is stopped the bucket may be used to extremely good advantage in dredging ditches or making embankments since it is unnecessary in connection with discharge of the excavated material to rotate the deck together with the boom.

Another object of the invention is to provide a drag line bucket of the last mentioned character which comprises: (1) a pair of upstanding links which are located outwards of the sides of the bucket and have the lower ends thereof connected pivotally to outwardly extending lugs on the rear ends of the bucket sides and their upper ends extending forwards and provided with means for attachment to the lower ends of the hoist chains; and (2) a bail which has the free ends of the side legs thereof pivotally connected to the central or intermediate portions of the links and the other or cross connected ends of its side legs provided with means for attachment to the drag chains, embodies forwardly extending lugs on the ends of the crosspiece thereof, is adapted in connection with initial take up of the drag line during a bucket dragging operation to shift bodily forwards into a position wherein the forwardly extending lugs on the ends of its crosspiece are in interlocked relation with lugs on the sides of the arch and coact with such lugs to hold the bail and bucket proper against relative swinging movement, and is further adapted at the end of a bucket dragging operation and in connection with take up of the hoist line to be shifted rearwards into a position wherein its forwardly extending lugs are out of interlocked relation with the lugs on the sides of the arch and the bucket proper is hence freed so that it may swing downwards relatively to the bail into a depending material discharging position.

A further object of the invention is to provide a drag line bucket of the last mentioned type and character which comprises releasable means whereby the bail may be locked in its forwardly shifted position wherein its lugs are in interlocked relation with the lugs on the sides of the arch in order that the bucket as a whole may, if desired, be used or operated as a conventional or standard drag line bucket.

A still further object of the invention is to provide a drag line bucket which is generally of new and improved construction and has greater capabilities of use than previously designed buckets.

Other objects of the invention and the various advantages and characteristics of the present drag line bucket will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views.

The drag line bucket which is shown in Figures 1 to 5, inclusive, constitutes one form or embodiment of the invention. It embodies as its principal components a bucket proper 10, a pair of upstanding links 11 and a bail 12 and is illustrated in connection with a conventional mobile derrick D. The latter comprises a wheel equipped truck $d$, a deck $d^1$, a boom $d^2$, a hoist line $d^3$ and a drag line $d^4$. The truck $d$ of the derrick is provided with flanged wheels $d^5$ so that it is capable of travelling on a railroad type track. The deck $d^1$ is mounted on the truck $d$ for rotation about a vertical axis and supports a prime mover (not shown) whereby the truck may be propelled in either direction along the track. The boom $d^2$ projects outwards from the front end of the deck and has the inner end thereof pivotally connected to the deck so that it is capable of swinging upwards and downwards by suitable power driven mechanism on the deck. The hoist line $d^3$ leads from a power driven winch (not shown) on the derrick deck $d^1$ and passes over a vertically extending sheave $d^6$ at the outer or distal end of the boom $d^2$. The drag line $d^4$ leads from a power driven winch (also not shown) on the deck and passes over a sheave $d^7$ which is mounted on the front portion of the deck adjacent the inner or proximal end of the boom.

Figure 1:
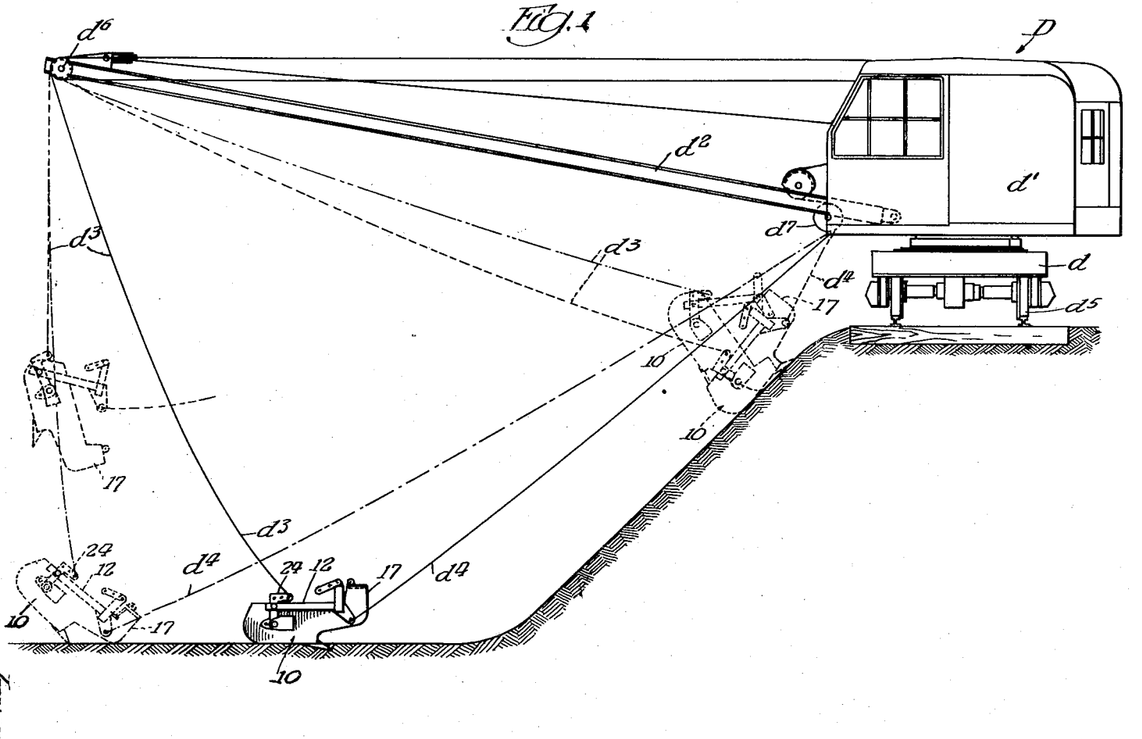
Figure 1 is a side view of a derrick having associated therewith a drag line bucket embodying one form of the invention.
Figure 2:
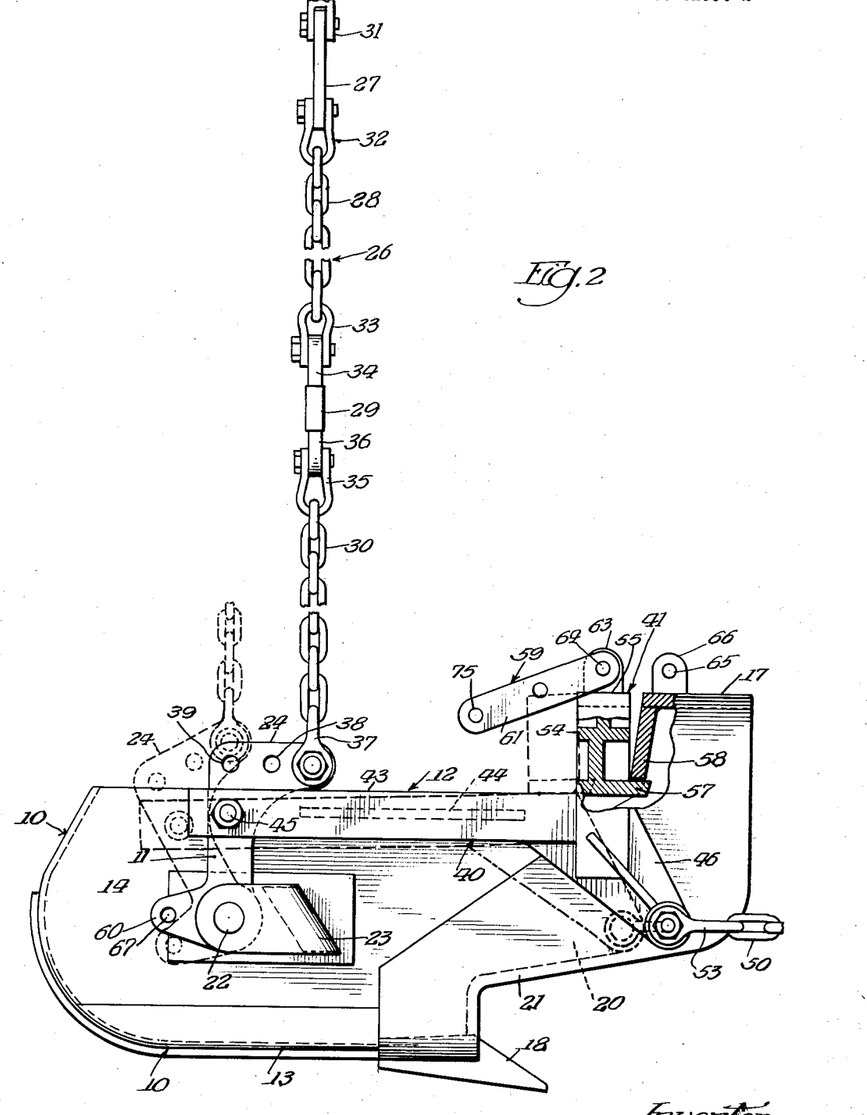
Figure 2 is an enlarged side view of the bucket of Figure 1, certain parts being broken away and other parts being shown in section for illustrative purposes.

The bucket proper 10 is open at the front and top and comprises a bottom 13, a pair of sides 14, a back 16 and an arch 17, all of which are formed of comparatively thick plate metal. The bottom 13 is substantially flat and has along the front end thereof a plurality of laterally spaced teeth 18. The latter project forwards of the front edge of the bottom 13 and have bifurcated rear ends which straddle the front end of the bottom and are secured in place by rivets 19. The sides 14 of the bucket proper are connected to, and extend upwards from, the side margins of the bottom and are arranged in parallel relation. The front upper corners of the sides 14 are provided with extensions 20 and these, as shown in Figure 2, project forwards of, and are located above the front end of, the bottom 13. The back 16 is joined to, and projects upwards from, the rear margin of the bottom 13 and has its end margin joined or connected to the rear margins of the sides 14. Preferably the back is curved, as shown in Figure 2. The arch 17 is located at the front end of the bucket proper 10 and is provided at the ends thereof with rearwardly extending extensions 21, which lap and are welded or otherwise fixedly secured to the extensions 20 on the front upper corners of the sides 14. The front corners of the ends of the arch are rounded or curved for purposes well understood in the art.

Figure 4:
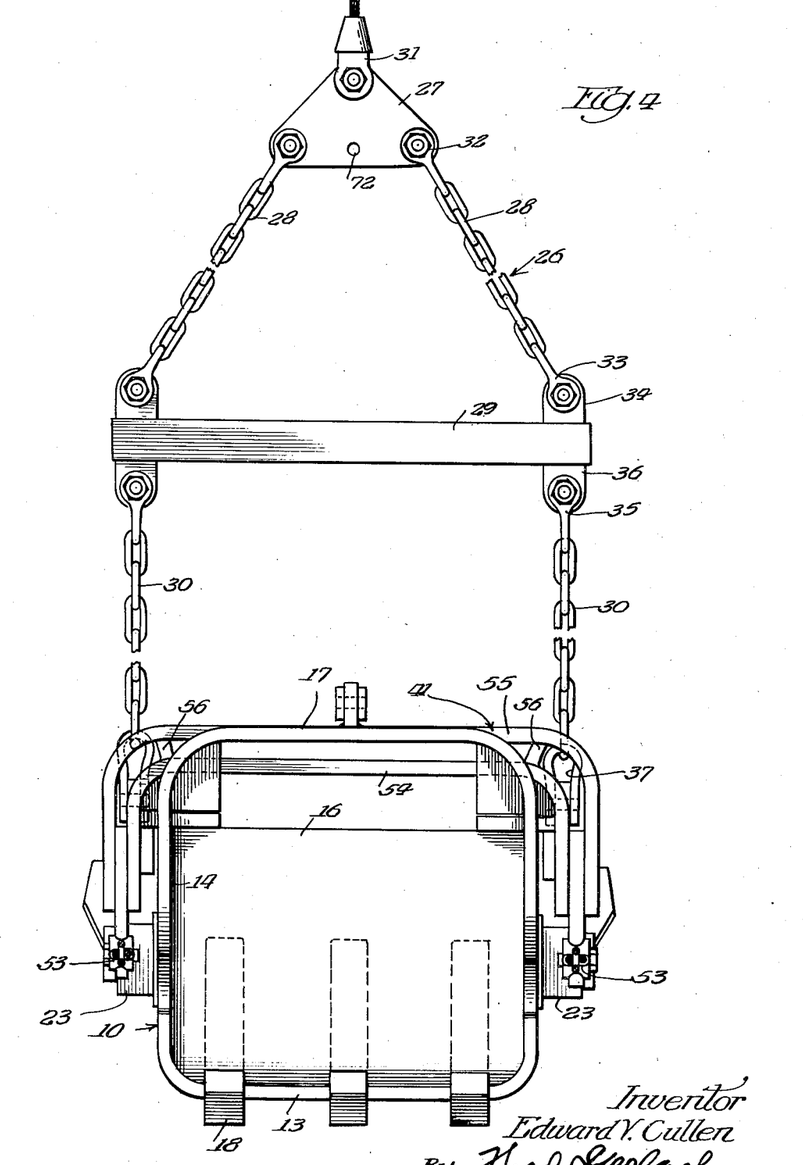
Figure 4 is an enlarged front view of the bucket of Figure 1.

The upstanding links 11 of the bucket are located outwards of the rear ends of the sides 14 and have the lower ends thereof pivotally supported by way of pivot pins 22 in order that they are permitted to swing forwards and rearwards relatively to the bucket proper 10. The pivot pins 22 are carried by U-shaped brackets 23 on the outer faces of the rear ends of the sides 14 and extend through holes in the lower ends of the links 11. As shown in the drawings the pivot pins 22 extend at right angles to the sides 14 and are positioned substantially midway between the top and bottom margins of the sides. The upper ends of the links 11 are provided with forwardly extending right angle extensions 24 and these are provided at the front ends thereof with transversely extending holes 25. A harness 26 serves to connect the links 11 to the free end of the derrick hoist line $d^3$. This harness comprises a triangular plate 27, a pair of upper chains 28, a spreader rod 29, and a pair of lower chains 30. One corner of the plate 27 is connected to the free end of the drag line by a clevis type device 31, as shown in Figure 4. The upper chains 28 extend between the two other corners of the plate 27 and the ends of the spreader rod 29. The upper ends of the chains 28 are connected to said two other corners of the plate 27 by clevises 32 and the lower ends of the chains 28 are connected by clevises 33 to apertured upstanding lugs 34 on the ends of the spreader rod. The lower chains 30 extend between the ends of the spreader rod 29 and the front ends of the extensions 24 on the upper ends of the links 11. The upper ends of the chains 30 are connected by clevises 35 to apertured depending lugs 36 on the ends of the spreader rod 29 and the lower ends of said chains are provided with clevises 37, the removable pins of which extend through the holes 25 in the front ends of the elongated extensions 24. The spreader rod 29 is of such length that it holds the chains 30 in substantially parallel relation when the harness 26 is in its bucket supporting position. By reason of the fact that the chains 30 of the harness 26 are connected to the front ends of the extensions 24 the links are caused to swing rearwards with respect to the bucket proper when the harness 26 is raised or pulled upwards as the result of take up of the derrick hoist line $d^3$. The extensions 24 at the upper ends of the links 11 are provided with additional transverse holes 38 and 39 in order that the clevises 37 on the lower ends of the lower chains 30 may be selectively connected to different portions of the extensions. The holes 38 are located in the central portions of the extensions and the holes 39 are located in the rear ends of the extensions.

Figure 3:
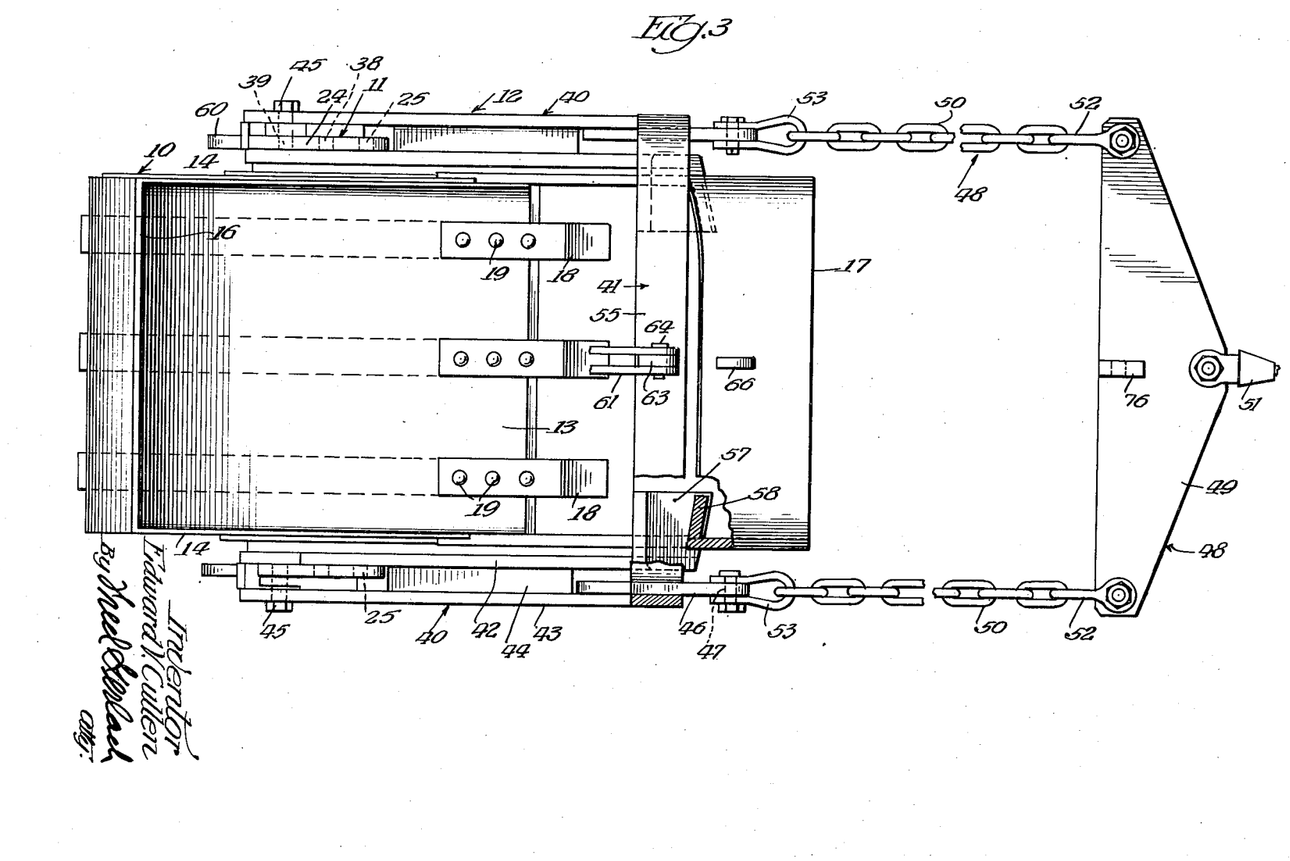
Figure 3 is an enlarged plan view of the bucket of Figure 1, the bail being shown in its forwardly shifted position wherein the forwardly extending lugs on the ends of its crosspiece are in interlocked relation with the lugs on the side of the arch and coact with the latter lugs to hold the bail and bucket against relative swinging movement.

The bail 12 is located adjacent the upper portion of the bucket proper 10 and comprises a pair of parallel laterally spaced legs 40 and an arched crosspiece 41. In connection with a bucket dragging operation the legs 40 are in parallel relation with the upper margins of the sides 14, as shown in Figure 2. The crosspiece 41 of the bail is connected to, and extends across the front ends of, the legs 40. The bail legs consist of inner leg members 42 and outer leg members 43 and these are positioned in parallel spaced apart relation and are cross connected by webs 44 which extend lengthwise of, and are welded or otherwise fixedly secured to, the central portions of the inner and outer leg members. The rear and inner ends of the inner and outer leg members 42 and 43 are positioned in straddled relation with the central portions of the links 11 and are pivotally connected thereto by way of pivot pins 45. The latter extend through aligned holes in the central portions of the links and the rear ends of the leg members 42 and 43. They are suitably secured against axial displacement and permit relative swinging movement of the bail and links. The front or cross connected ends of the bail legs 40 are provided with forwardly and downwardly extending plate type arms 46. Such arms are disposed adjacent the side or end portions of the arch 17 when the bail is in the position shown in Figure 2 and have holes 47 at their outer ends. The inner ends of the arms 46 fit against, and are welded to, the inner surfaces of the front ends of the outer leg members 43. The arms 46 are connected to the free end of the drag line $d^4$ of the derrick by way of a harness 48. The latter, as shown in Figure 3, comprises a spreader plate 49 and a pair of drag chains 50. The central portion of the spreader plate 49 is pivotally connected to the free end of the derrick drag line $d^4$ by a clevis type device 51. Certain ends of the chains 50 are pivotally connected to the ends of the spreader plate 49 by clevises 52 and the other ends of the chains 50 are provided with clevises 53, the removable pins of which extend through the holes 47 in the outer ends of the arms 46. The arched crosspiece 41 of the bail 12 comprises a U-shaped inner member 54 and a U-shaped outer member 55. These two members are connected together in spaced apart relation by web pieces 56. The ends of the inner member 54 of the bail crosspiece are suitably connected to the front ends of the inner members 42 of the bail legs 40 and the ends of the outer member 55 are suitably connected to the front ends of the outer leg members 43 of the bail legs 40. The crosspiece 41 of the bail is provided with a pair of forwardly extending lugs 57 and these are adapted when the bail is shifted forwards in response to take up of the drag line $d^4$ while the hoist line is slack, to move into interfitting or interlocked relation with a pair of lugs 58 on the sides of the arch 17 and coact with the latter lugs to hold the bail and bucket proper against relative swinging movement. The lugs 57 are welded to, and project inwards from, the ends of the inner member 54 of the arched crosspiece 41 of the bail and are adapted when the bail is in the position shown in Figure 2 to rest on the upper edges of the sides 14 and limit or restrict downward swinging of the bail with respect to the bucket proper. The lugs 58 are welded to, and project inwards from, the sides of the arch 17 and are arranged so that they overlie the front ends of the lugs 57 when the bail is in the position shown in Figure 2. When the two pairs of lugs are in interlocked relation as a result of the bail being in the position shown in Figure 2 the bail and bucket proper are locked or held against relative swinging movement, as heretofore pointed out. When the harness 26 is subjected to upward pull in response to take up of the hoist line the links 11 swing rearwards relatively to the bucket proper and result in the bail 12 being shifted rearwards into a position wherein the forwardly extending lugs 57 are out of interlocked relation with the lugs 58. When the lugs 57 are out of interlocked relation with the lugs 58 as a result of the bail 12 being shifted rearwards in response to hoisting of the harness 26 the bucket proper is released or freed and hence may swing downwards relatively to the bail into a material discharging position. The pivot pins 22 constitute the pivot axis about which the bucket proper swings with respect to the bail 12.

When it is desired to use the bucket of Figures 1 to 5, inclusive, in connection with dredging a ditch, making an embankment or any similar or like work the bucket is hoisted toward the outer end of the derrick boom $d^2$ while the drag line $d^4$ is slack. In connection with hoisting of the bucket the bail 12 is shifted rearwards in response to rearward rocking of the links 11 with the result that the bucket proper is released so that it swings downwards into a depending or substantially vertical position as shown in dotted lines in Figure 1. After hoisting of the bucket toward the outer end of the boom the bucket is lowered by paying out the hoist line $d^3$. In connection with lowering of the bucket the rounded front lower corners of the arch 17 are first brought into contact with the subjacent surface (ground or other material). In connection with further paying out of the hoist line the bucket proper rocks or tilts in a counterclockwise direction as viewed in Figure 1 until the teeth 18 strike the subjacent surface. In response to further paying out of the hoist line the bail 12 swings downwards and then slides forwards in response to the action of gravity. In connection with forward sliding of the bail the lugs 57 on the ends of the crosspiece 41 of the bail slide or move into interlocked relation with the coacting lugs 58 on the sides of the arch 17 and thus result in locking of the bail and bucket proper against relative swinging movement. After forward sliding of the bail the drag line $d^4$ is taken up while the hoist line is slack. Take up on the part of the drag line causes the bucket to be drawn towards the derrick deck. As soon as the bucket is dragged toward the deck to the desired extent the hoist line $d^3$ is taken up with the result that the bail 12 is shifted rearwards into a position wherein the lugs 57 are disengaged from the lugs 58 and the bucket proper is thus freed for swinging movement relatively to the bail. In connection with further take up on the part of the hoist line while the drag line is under tension the bail is raised resulting in downward swinging of the bucket proper and discharge of the excavated material. After discharge of the material the bucket is shifted to the outer end of the boom $d^2$ where it is in readiness for another excavating operation. By reason of the fact that the bucket includes the links 11, the bail 12 and the coacting lugs 57 and 58 it is possible to discharge the excavated material from the bucket proper at the point where dragging of the bucket is stopped.

Figure 5:
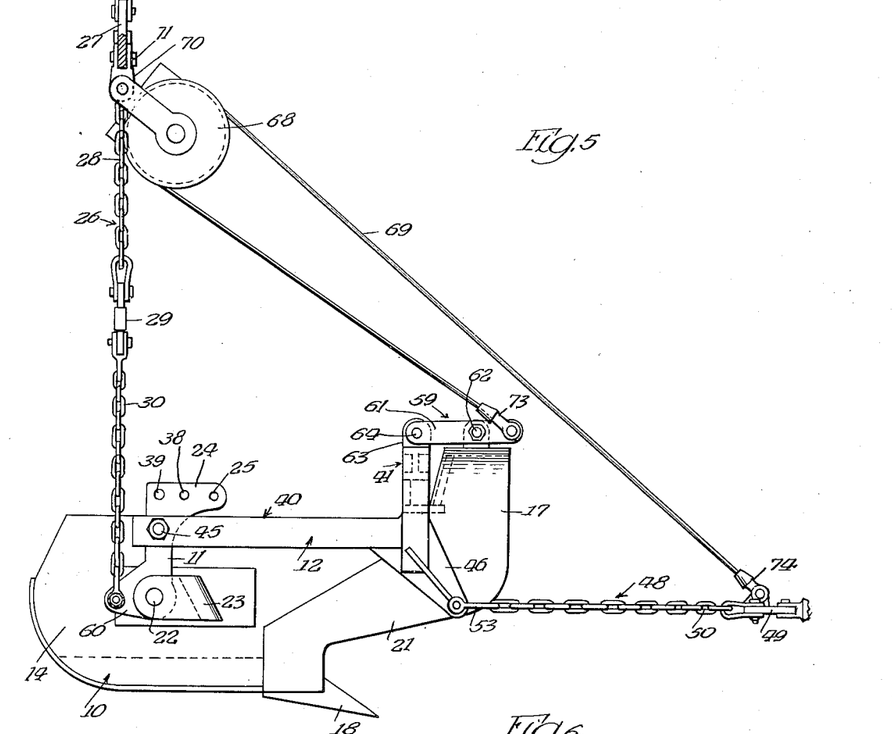
Figure 5 is a side view showing the bucket of Figure 1 with the bail locked in its forwardly shifted position, and rigged or arranged for use as a conventional or standard drag line bucket.

In order to make it possible to use or operate the bucket as a conventional or standard drag line bucket the bucket is provided with a releasable locking device 59 and a pair of lugs 60. The device 59 when in its operative or locking position serves to lock the bail 12 in its forwardly shifted position wherein the lugs 57 are in interlocked relation with the lugs 58. It comprises an arm 61 and a bolt 62. One end of the arm 61 is pivotally connected to an upstanding lug 63 on the central portion of the outer member 55 of the bail crosspiece 41 by way of a pivot pin 64. The pivot pin extends through aligned holes in the lug 63 and said one end of the arm 61 and is arranged so that the arm is permitted to swing lengthwise of the bucket proper 10. The bolt 62 extends through a hole in the central portion of the arm 61 and is adapted when the bail 12 is shifted forwards, as shown in Figure 2, and the arm is swung into overhanging relation with the central portion of the arch 17, to be inserted through a hole 65 in an upstanding lug 66 on said central portion of the arch. When it is desired to utilize the device 59 in connection with use of the bucket as a conventional or standard drag line bucket the bail 12 is shifted forwards so as to bring the lugs 57 into interlocked relation with the lugs 58. Thereafter the arm 59 is swung forwards into a position wherein the central portion thereof is in lapped relation with the upstanding lug 66 on the central portion of the arch 17. After so swinging the arm the bolt 62 is passed through the hole 65 in the lug 66. As soon as the bolt is in place the bail 12 is locked in its forwardly shifted position and the bail and bucket proper are therefore in rigid relation. To release the device 59 so as to permit the bucket to be used as originally intended it is only necessary to withdraw the bolt 62 from the hole 65 in the lug 66 and then swing the arm 61 rearwards. The lugs 60 are formed integrally with, and project rearwards from, the lower ends of the links 11 and have holes 67 for receiving the pins of the clevises 37. It is contemplated that when the bucket is used as a conventional or drag line bucket the lower ends of the lower chains 30 of the harness 26 will be connected to the lugs 60 in order that the points of attachment of the chains 30 will be properly positioned with respect to the points of attachment of the chains 50 to the arms 46. It is also contemplated that in connection with use or operation of the bucket as a conventional or standard drag line bucket a sheave 68 and a leveling line 69 will be employed. The sheave 68 is connected to the triangular plate 27 of the harness 26 by way of an arm 70 and a bolt 71. One end of the arm 70 is pivotally connected to the frame of the sheave 68, as shown in Figure 5. The bolt 71 extends through the other end of the arm 70 and through a hole 72 in the triangular plate 27. The leveling line 69 is reeved around the sheave 68 and is provided at its ends with clevises 73 and 74. The pin of the clevis 73 extends through a hole 75 in the outer or distal end of the arm 61 of the releasable locking device 59. The pin of the other clevis, i. e., the clevis 74, extends through an apertured lug 76 on the central portion of the spreader plate 49 of the harness 48.

The drag line bucket of Figures 1 to 5, inclusive, is comparatively simple in design and construction and hence may be manufactured at a reasonable cost. It may be used to extremely good advantage in dredging ditches or making embankments and has greater capabilities of use than conventional or standard drag line buckets. By reason of the fact that the bucket includes the links 11, the bail 12 and the coacting lugs 57 and 58 it is possible when the bucket is used as intended to discharge the excavated material adjacent the deck of the derrick, as shown by dotted lines in Figure 1. In connection with nonconventional use of the bucket the excavated material may be discharged at any point near the derrick deck and without the necessity of shifting the bucket to the outer end of the boom and then swinging the deck and boom laterally.

Figure 6:
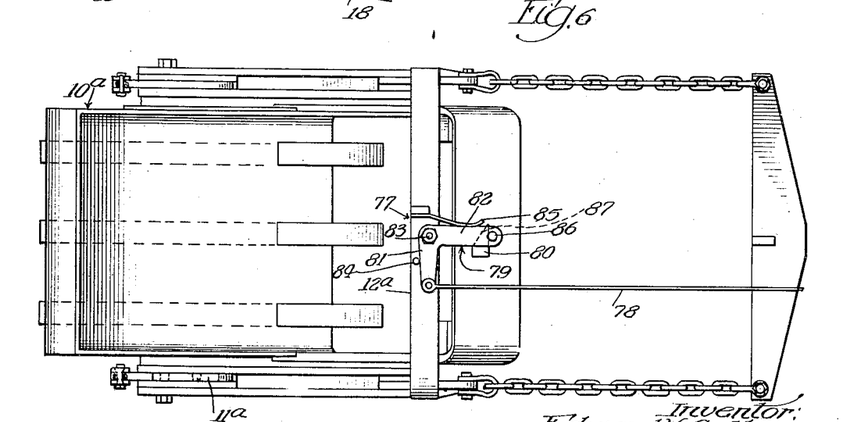
Figure 6 is a plan view of a second or modified form of drag line bucket having a latch which is controlled by a trip line leading to the deck of the derrick and serves releasably to lock the bail in its forwardly shifted position.

The drag line bucket which is shown in Figure 6 constitutes a modified form or second embodiment of the invention. It comprises a bucket proper 10$^a$, a pair of upstanding links 11$^a$, and a bail 12$^a$ and is exactly the same in design and construction as the bucket of Figures 1 to 5, inclusive, except that instead of having a releasable locking device like the device 59 it has a latch 77 for releasably locking the bail in its forwardly shifted position wherein its lugs are in interlocked relation with the lugs on the sides of the arch of the bucket proper. The latch 77 is released from the deck of the derrick by way of a trip line 78 and consists of a bell crank type latch member 79 and a lug 80. The latch member 79 is mounted on the crosspiece of the bail 12$^a$ and consists of a pair of arms 81 and 82. Such arms are joined together and extend at right angles to one another, as shown in Figure 6. The arm 81 overlies the crosspiece of the bail 12$^a$ and the arm 82 extends forwards. A pivot pin 83 is connected to, and projects upwards from, the central portion of the crosspiece of the bail 12$^a$, and extends through a hole in the connected or joined together ends of the arms 81 and 82 in order that the latch member 79 is permitted to rock. A stop pin 84 serves to limit clockwise rotation of the latch member 79 as viewed in Figure 6. Such pin is connected to, and projects upwards from, the central portion of the crosspiece of the bail 12$^a$ and is arranged in the path of the arm 81. A leaf spring 85 is applied to the arm 82 and urges the latch member 79 to rock or rotate in the direction of the stop pin 84. One end of the leaf spring 85 is fixedly connected to the crosspiece of the bail 12$^a$ and the other end bears against the central portion of the arm 82. The outer end of the arm 82 is provided with a depending latch pin 86 which engages the front face of the lug 80 when the latch device 77 is in its locked or latched position, as shown in full lines in Figure 6. The lug 80 is connected to, and projects upwards from, the central portion of the arch of the bucket proper 10ª and has an angled or canted rear face 87. When the bail 12ª is shifted forwards relatively to the bucket proper 10ª the latch pin 86 strikes against the canted rear face 87 of the lug 80 and such face cams the pin together with the latch member 79 in a counterclockwise direction until the pin is in alignment with the front face of the lug. At such time the leaf spring 85 rotates the latch member in a clockwise direction as viewed in Figure 6 and causes the pin 86 to become interlocked with the lug 80. When the pin 86 and the lug are in interlocked relation the latch member 79 serves to lock the bail 12ª in its forwardly shifted position with respect to the bucket proper 10ª. One end of the trip line 78 is connected to the outer end of the arm 81 of the latch member 79 and the other end of the trip line leads to the derrick deck. When it is desired to release the latch device 77 the trip line 78 is pulled. Pulling of the trip line results in the latch member 79 being rocked or rotated in a counterclockwise direction, thus disengaging the latch pin 85 from the front face of the lug 80.

The latch device 77 automatically latches in connection with initial drag of the bucket by the drag line of the derrick with which the bucket is used. When the bucket is dragged toward the derrick deck to the desired extent and it is desired to discharge the excavated material the latch device 77 is released by pulling on the trip line 78. As soon as the trip line is pulled and the latch device 77 is thus released the bail 12ª is freed. Upon freeing of the bail rearward swinging of the links 11ª in response to take up of the derrick hoist line results in rearward shift of the bail with respect to the bucket proper 10ª and the bucket proper swinging downwards into its discharging position. By employing the latch 77 the bucket proper may be manipulated into its discharging position at any point under the boom of the derrick. If it is desired to use or operate the bucket of Figure 6 as a conventional or standard drag line bucket the latch device 77 is maintained or left in its latched position wherein the latch pin 86 is in interlocked relation with the upstanding lug 80 on the central portion of the arch of the bucket proper.

The invention is not to be understood as restricted to the details set forth since these may be modified within the scope of the appended claims without departing from the spirit and scope of the invention.

Having thus described the invention what I claim as new and desire to secure by Letters Patent is:

1. A drag line bucket adapted for use with a derrick having power actuated hoist and drag lines, and comprising an open front body, a pair of upstanding links having the lower ends thereof so pivotally connected to the rear portions of the body sides that they are permitted to swing forwards and rearwards relatively to the body and provided at their upper ends with means for attachment to the derrick hoist line, a bail having the free ends of the legs thereof pivotally connected to the central portions of the links, provided adjacent the cross connected ends of its legs with means for attachment to the derrick drag line, and adapted in response to take up of the drag line while the hoist line is slack to move forwards with respect to the body and in response to take up of the hoist line to move rearwards relatively to the body, and means between the bail and the body whereby the bail and body are interlocked against relative swinging movement when the bail is moved forwards and the body is released from the bail for downward swinging movement relatively thereto when the bail is moved rearwards.

2. A drag line bucket adapted for use with a derrick having power actuated hoist and drag lines, and comprising an open front body with a lug equipped arch extending across the upper front corners of its sides, a pair of upstanding links having the lower ends thereof so pivotally connected to the rear portions of the body sides that they are permitted to swing forwards and rearwards relatively to the body and provided at their upper ends with means for attachment to the derrick hoist line, and a bail having the free ends of the legs thereof pivotally connected to the central portions of the links, embodying adjacent the cross connected ends of its legs means for attachment to the drag line, adapted in response to take up of the drag line while the hoist line is slack to move forwards with respect to the body and in response to take up of the hoist line to move rearwards relatively to the body, and provided with a lug adapted when the bail is shifted forwards to become so interlocked with the lug on the arch as to lock the bail and body against relative swinging movement and when the bail is moved rearwards to become disengaged from the lug on the arch and thus release the body for downward swinging movement relatively to the bail.

3. A drag line bucket adapted for use with a derrick having power actuated hoist and drag lines, and comprising an open front body having across the upper front corners of its sides an arch with an inwardly extending lug, a pair of upstanding links having the lower ends thereof so pivotally connected to the rear portions of the body sides that they are permitted to swing forwards and rearwards relatively to the body, provided at their upper ends with means for attachment to the derrick hoist line, and a bail having the free ends of the legs thereof pivotally connected to the central portions of the links, embodying adjacent the cross connected ends of its legs means for attachment to the derrick drag line, adapted in response to take up of the drag line and while the hoist line is slack to move forwards with respect to the body and in response to take up of the hoist line to move rearwards relatively to the body, and provided on the crosspiece thereof with a forwardly extending lug adapted when the bail is moved forwards to become so interlocked with the lug on the arch as to lock the bail and body against relative swinging movement and when the bail is shifted rearwards to become disengaged from the lug on the arch and thus release the body for downward swinging movement relatively to the bail.

4. A drag line bucket adapted for use with a derrick having power actuated hoist and drag lines, and comprising an open top and front body having across the upper front corners of its sides an arch with inwardly extending lugs at its sides, a pair of upstanding links having the lower ends thereof so pivotally connected to the rear portions of the body sides that they are permitted to swing forwards and rearwards relatively to the body, and provided at their upper ends with means for attachment to the derrick hoist line, and a bail having the free ends of the legs thereof pivotally connected to the central portions of the links, embodying adjacent the cross connected end of its legs means for attachment to the derrick drag line, adapted in response to take up of the drag line while the hoist line is slack to move forwards with respect to the body and in response to take up of the hoist line to move rearwards relatively to the body, and provided at the ends of its crosspiece with a pair of forwardly extending lugs adapted when the bail is moved forwards to become so interlocked with the lugs on the arch as to lock the bail and body against relative swinging movement, and when the bail is moved rearwards to become disengaged from the lugs on the arch and thus release the body so that it is free to swing downwards relatively to the bail.

5. A drag line bucket adapted for use with a derrick having power actuated hoist and drag lines, and comprising an open front body, a pair of upstanding links having the lower ends thereof so pivotally connected to the rear portions of the body sides that they are permitted to swing forwards and rearwards relatively to the body, embodying at the upper ends thereof forwardly extending extensions having means at their front ends for attachment to the derrick hoist line, a bail having the free ends of the legs thereof pivotally connected to the central portions of the links, provided adjacent the cross connected ends of its legs with means for attachment to the derrick drag line, and adapted in response to take up of the drag line while the hoist line is slack to move forwards with respect to the body and in response to take up of the hoist line to move rearwards relatively to the body, and means between the bail and the body whereby the bail and body are interlocked against relative swinging movement when the bail is moved forwards and the body is released from the bail for downward swinging movement relatively thereto when the bail is moved rearwards.

6. A drag line bucket adapted for use with a derrick having power actuated hoist and drag lines, and comprising an open top and front body, a pair of upstanding links having the lower ends thereof so pivotally connected to the rear portions of the body sides that they are permitted to swing forwards and rearwards relatively to the body and provided at their upper ends with means for attachment to the derrick hoist line, a bail having the free ends of the legs thereof pivotally connected to the central portions of the links, embodying at the cross connected ends of its legs forwardly and downwardly extending arms having means at their outer ends for attachment to the derrick drag line, and adapted in response to take up of the drag line while the hoist line is slack to move forwards with respect to the body and in response to take up of the hoist line to move rearwards relatively to the body, and means between the bail and body whereby the bail and body are interlocked against relative swinging movement when the bail is moved forwards and the body is released from the bail for downward swinging movement relatively thereto when the bail is moved rearwards.

7. A drag line bucket adapted for use with a derrick having power actuated hoist and drag lines, and comprising an open top and front body having across the upper front corners of its sides an arch with a pair of inwardly extending lugs at its sides, a pair of upstanding links having the lower ends thereof so pivotally connected to the rear portions of the body sides that they are permitted to swing forwards and rearwards relatively to the body and embodying at the upper ends thereof forwardly extending extensions with means at the front ends thereof for attachment to the derrick hoist line, and a bail having the free ends of the lugs thereof pivotally connected to the central portions of the links, embodying at the cross connected ends of its legs forwardly and downwardly extending arms with means at the outer ends thereof for attachment to the derrick drag line, adapted in response to take up of the drag line while the hoist line is slack to move forwards with respect to the body and in response to take up of the hoist line to move rearwards relatively to the body, and embodying at the ends of its crosspiece a pair of forwardly extending lugs adapted when the bail is moved forwards to become so interlocked with lugs on the arch as to lock the bail and body against relative swinging movement and when the bail is moved rearwards to become disengaged from the lugs on the arch and thus release the body for downward swinging movement relatively to said bail.

8. A drag line bucket adapted for use with a derrick having power actuated hoist and drag lines, and comprising an open front body, a pair of upstanding links having the lower ends thereof so pivotally connected to the rear portions of the body sides that they are permitted to swing forwards and rearwards relatively to the body and provided at their upper ends with means for attachment to the derrick hoist line, a bail having the free ends of the legs thereof pivotally connected to the central portions of the links, provided adjacent the cross connected ends of its legs with means for attachment to the derrick drag line, and adapted in response to take up of the drag line while the hoist line is slack to move forwards with respect to the body and in response to take up of the hoist line to move rearwards relatively to the body, means between the bail and the body whereby the bail and body are interlocked against relative swinging movement when the bail is moved forwards and the body is released from the bail for downward swinging movement relatively thereto when the bail is moved rearwards, and releasable means for locking the bail in the position it assumes when it is moved forwards.

9. A drag line bucket adapted for use with a derrick having power actuated hoist and drag lines, and comprising an open front body with a lug equipped arch extending across the upper front corners of its sides, a pair of upstanding links having the lower ends thereof so pivotally connected to the rear portions of the body sides that they are permitted to swing forwards and rearwards relatively to the body and provided at their upper ends with means for attachment to the derrick hoist line, a bail having the free ends of the legs thereof pivotally connected to the central portions of the links, embodying adjacent the cross connected ends of its legs means for attachment to the drag line, adapted in response to take up of the drag line while the hoist line is slack to move forwards with respect to the body and in response to take up of the hoist line to move rearwards relatively to the body, and provided with a lug adapted when the bail is shifted forwards to become so interlocked with the lug on the arch as to lock the bail and body against relative swinging movement and when the bail is moved rearwards to become disengaged from the lug on the arch and thus release the body for downward swinging movement relatively to the bail, and releasable means between the crosspiece of the bail and the arch on the body for locking the bail in the position it assumes when it is moved forwards with respect to the body.

10. A drag line bucket adapted for use with a derrick having power actuated hoist and drag lines, and comprising an open top and front body having across the upper front corners of its sides an arch with a pair of inwardly extending lugs at its sides, a pair of upstanding links having the lower ends thereof so pivotally connected to the rear portions of the body sides that they are permitted to swing forwards and rearwards relatively to the body and embodying at the upper ends thereof forwardly extending extensions with means at the front ends thereof for attachment to the derrick hoist line, a bail having the free ends of the legs thereof pivotally connected to the central portions of the links, embodying at the cross connected ends of its legs forwardly and downwardly extending arms with means at the outer ends thereof for attachment to the derrick drag line, adapted in response to take up of the drag line while the hoist line is slack to move forwards with respect to the body and in response to take up of the hoist line to move rearwards relatively to the body, and embodying at the ends of its crosspiece a pair of forwardly extending lugs adapted when the bail is moved forwards to become so interlocked with the lugs on the arch as to lock the bail and body against relative swinging movement and when the bail is moved rearwards to become disengaged from the lugs on the arch and thus release the body for downward swinging movement relatively to said bail, and releasable means between the crosspiece of the bail and the arch on the body for locking the bail in the position it assumes when it is moved forwards with respect to the body.

11. A drag line bucket adapted for use with a derrick having power actuated hoist and drag lines, and comprising an open front body, a pair of upstanding links having the lower ends thereof so pivotally connected to the rear portions of the body sides that they are permitted to swing forwards and rearwards relatively to the body and provided at their upper ends with means for attachment to the derrick hoist line, a bail having the free ends of the legs thereof pivotally connected to the central portions of the links, provided adjacent the cross connected ends of its legs with means for attachment to the derrick drag line, and adapted in response to take up of the drag line while the hoist line is slack to move forwards with respect to the body and in response to take up of the hoist line to move rearwards relatively to the body, means between the bail and the body whereby the bail and body are interlocked against relative swinging movement when the bail is moved forwards and the body is released from the bail for downward swinging movement relatively thereto when the bail is moved rearwards, and releasable means for locking the bail in the position it assumes when it is moved forwards, the lower ends of the links being provided with rearwardly extending lugs having means whereby the derrick hoist line may be connected to them when the releasable locking means is in its locked position and it is desired to use the bucket as a conventional or standard drag line bucket.

12. A drag line bucket adapted for use with a derrick having power actuated hoist and drag lines, and comprising an open front body, a pair of upstanding links having the lower ends thereof so pivotally connected to the body sides that the links are permitted to swing forwards and rearwards relatively to the body, a bail having the free ends of the legs thereof connected to the upper portions of the links by pivotal connections, and provided adjacent the cross connected ends of its legs with means for attachment to the derrick drag line, hoist line attaching means adjacent said pivotal connections whereby when the hoist line is taken up the bail is caused to move rearwards with respect to the body, said bail being adapted in response to take-up of the drag line while the hoist line is slack to move forwards relatively to the body, and means between the bail and body whereby the bail and body are interlocked against swinging movement when the bail is moved forwards and in addition the body is released from the bail for downward movement relatively thereto when the bail is moved rearwards.

EDWARD V. CULLEN.

REFERENCES CITED

The following references are of record in the file of this patent:

UNITED STATES PATENTS

| Number | Name | Date |
| --- | --- | --- |
| 1,201,468 | Iverson | Oct. 17, 1916 |